United States Patent [19]
Stover et al.

[11] Patent Number: 5,955,654
[45] Date of Patent: Sep. 21, 1999

[54] CALIBRATION STANDARD FOR MICROROUGHNESS MEASURING INSTRUMENTS

[75] Inventors: John C. Stover, Charlotte, N.C.; Bradley W. Scheer, San Jose, Calif.

[73] Assignee: VLSI Standards, Inc., San Jose, Calif.

[21] Appl. No.: 08/908,524

[22] Filed: Aug. 7, 1997

[51] Int. Cl.⁶ .................................................... G01B 5/28
[52] U.S. Cl. ............................................ 73/1.89; 73/105
[58] Field of Search ................................... 73/1.89, 1.01, 73/105; 216/2, 11

[56] References Cited

U.S. PATENT DOCUMENTS 5,599,464   2/1997   Laird et al. ................................. 216/2

OTHER PUBLICATIONS

W. Murray Bullis, "Microroughness of Silicon Wafers", paper presented at *Electrochemical Society Silicon Symposium*, San Francisco, California, pp. 1156–1169 (May 1994).

E. L. Church et al., "Relationship between Surface Scattering and Microtopogrphic Features", *Opt. Eng.*, vol. 18, No. 2, pp. 125–136 (Mar./Apr. 1979).

E. L. Church et al., "Direct comparison of mechanical and optical measurement of the finish of precision machined optical surfaces", *Opt. Eng.*, vol. 24, No. 3, pp. 388–395 (May/Jun. 1985).

P. Z. Takacs et al., "Step–Height Standard for Surface Profiler Calibration", *Proc. SPIE* 1995, pp. 235–244 (1993).

B. W. Scheer, "Developing a haze and a microroughness reference standard", *Micro* (Jun. 1996).

J. C. Stover, "Roughness characterization of smooth machined surfaces by light scattering", *Applied Optics*, vol. 14, No. 8, pp. 1796–1802 (Aug. 1975).

E. L. Church et al., "The Prediction of BRDFs from surface profile measurements", Proc. *SPIE* 1165, pp. 136–150 (Aug. 1989).

E. L. Church et al., "Comparison of optical and mechanical measurements of surface finish", *Proc. SPIE* 1531, pp. 234–250 (1991).

*Primary Examiner*—Daniel S. Larkin
*Attorney, Agent, or Firm*—Thomas Schneck; Mark Protsik

[57] ABSTRACT

A metrology standard that is useful for calibrating instruments for the levels of microroughness encountered in semiconductor, disk drive, and related industries today. In advanced applications, this level is about 5 Å rms in a $0.01–1.0\ \mu m^{-1}$ spatial bandwidth range. This standard uses a one-dimensional square wave pattern etched in a silicon wafer to reduce the effects of instrument spatial bandwidth. The standard has approximately a 20 $\mu m$ pitch with feature depths as small as 8 Å.

6 Claims, 9 Drawing Sheets

CALIBRATION STANDARD FOR MICROROUGHNESS MEASURING INSTRUMENTS

TECHNICAL FIELD

The invention relates to a microroughness standard for calibrating instruments such as optical surface profilometers, mechanical profilers, and scanning probe microscopes.

BACKGROUND ART

Microroughness is defined as "surface roughness components with spacings between irregularities (spatial wavelength) less than about 100 micrometers." This definition differentiates microroughness from the larger scale surface variations of bow and warp, which have spatial wavelengths typically on the order of several millimeters.

The very small levels of surface texture associated with microroughness are becoming more problematical in a number of industries as the complexity of integrated circuits and the amount of information stored on disk drives increases. As an example, geometries in the integrated circuit industry are fast approaching molecular dimensions. The June 1994 report, the National Technology Roadmap for Semiconductors (NTRS), has published a requirement for gate oxide thicknesses approaching 4.5 nm±4%. As a point of reference, the lattice constant for lightly doped (i.e., nearly pure) silicon is 0.543 nm. The gate dielectric molecule, silicon dioxide, is nominally 0.355 nm "diameter" (based on the cube root of the volume ratio). The ability of silicon dioxide or any film layer to function efficiently as an insulator depends partially on the underlying microroughness of the silicon surface. For oxides less than 10 nm, breakdown voltages are reduced commensurately with increased levels of microroughness. This can be readily understood by envisioning the "peaks" of the microroughness terrain as being much closer to the film surface than the overall average level of the peaks and valleys combined. Additionally, there are similar effects on film layers deposited in later processing steps, and an effect on bonding for silicon-on-insulator (SOI) applications.

Currently, there are several techniques available for measuring microroughness. However, the results tend to be qualitative. Until recently, there was no metrology standard available to correlate the accuracy of various instruments. This becomes especially important when comparing instruments with differing spatial bandwidths, each possessing a unique transfer function. Due to the varying spatial bandwidths, different types of instruments can give rms microroughness values that differ by over an order of magnitude, even when measuring the same surface.

An object of the invention is to provide a calibration standard used to verify the accuracy and precision of analytical test equipment for measuring microroughness, and thereby allow such equipment to provide absolute quantitative values based on such a standard instead of the relative qualitative results that are presently all that is available.

DISCLOSURE OF THE INVENTION

The object is met by a metrology standard for calibrating microroughness measuring instruments, which comprises a physical artifact having a generally smooth reflective surface, such as a clean, polished single crystal silicon wafer, providing a low level of isotropic background roughness, but with regular features formed on that surface. These features are characterized by a one-dimensional, 50% duty cycle, square wave pattern, such as a series of parallel, spaced apart, raised flat linear plateaus or mesas with essentially vertical sides alternating with parallel, spaced apart flat linear valleys between the mesas formed on the wafer surface, with the features having a periodicity or pitch of less than 100 $\mu$m, and preferably about 20 $\mu$m, and a single known feature depth of at least about 8 Å. This square wave pattern of features with a 50% duty cycle produces a one-dimensional power spectral distribution (PSD) which is not a continually smooth distribution, but rather has discrete peaks with 90% of the spectral power in the immediate spatial frequency range of the inverse of the pattern's pitch and with other peaks located at odd order harmonics of that primary or fundamental peak, as predicted by the Fourier transform of a square wave with 50% duty cycle. With a preferred 20 $\mu$m pitch, the primary spatial frequency peak is at 0.05 $\mu$m$^{-1}$, which is in the range available to most measurement instruments. Because 90% of the power is at this spatial frequency peak, a fairly accurate measure of rms-microroughness can be obtained using this standard even when the exact spatial bandwidth of the instrument is unknown, assuming that at least this first peak is captured.

Calibrating a microroughness measuring instrument involves placing the metrology standard in microroughness measuring relation to the instrument and measuring the microroughness of the standard. This measurement includes calculation of the observed PSD over a range of spatial frequencies characteristic of the instrument, including the primary 90% power peak, then integrating the PSD over the measured spatial frequency range and taking the square root of the integrated PSD. The root is a measure of rms-roughness of the standard. Comparing the roughness value obtained in this way with a calculated roughness value associated with the known feature depth of the standard allows a user to calibrate the instrument to obtain a quantitative measure of microroughness of any surface that is subsequently placed in the instrument. (This can be obtained by measurement with a proven instrument.) Multiple standards with different single known feature depths, or a single standard with different single known feature depths in different quadrants or regions of the wafer, could be used. Instruments that can be calibrated with this standard include mechanical profilers, atomic force microscopes, optical profilometers, interferometers, total integrated scatterometers and angle-resolved scatterometers.

BEST MODE FOR CARRYING OUT THE INVENTION

I. Introduction

The RQS (from the abbreviation for rms-roughness, Rq standard) uses a one-dimensional square wave to reduce the effects of bandwidth. Although the spatial bandwidth of the instrument is still important to know for the most accurate readings, the RQS makes use of the nature of the square wave to allow for fast, albeit somewhat less accurate, measurements with similar results obtained for many different types of microroughness measuring instruments. These concepts are discussed in detail below in sections II (Instrument Considerations) and IV (Determination of Specific Microroughness Values). The methodology used to produce this standard provides a known surface texture on a substrate with feature depths on different standards ranging from 1 nm to 10 nm. Generally, there is a single feature depth on any given standard, although different quadrants or regions of a wafer might contain different standards. In either case, different feature depths are not mixed. This is accomplished by precisely etching a square wave feature into silicon at known locations on a wafer, as seen in FIGS. 1–4. The imparted texture is fully quantifiable by angle resolved light scattering, measurements performed by atomic force microscopy, and other measurement techniques. By having these data available and knowing the spatial bandwidth of a given instrument, it is possible to provide a direct method of quantifying a prescribed surface texture or microroughness value.

Figure 1:
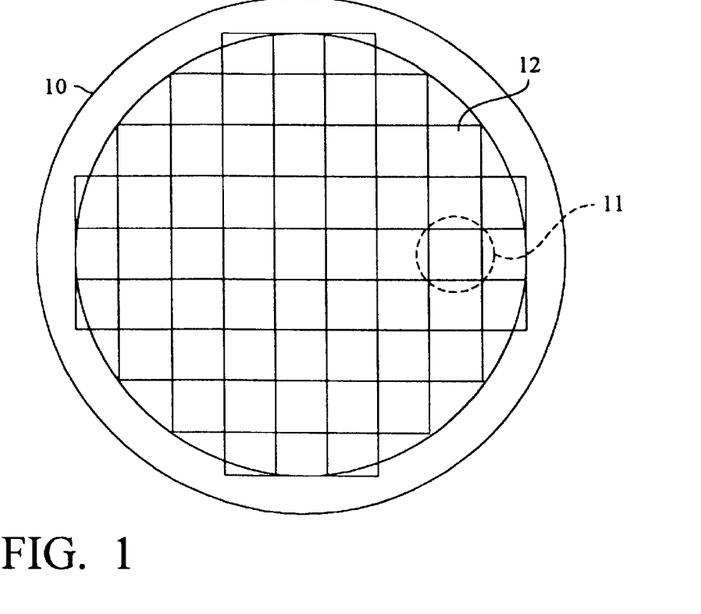
FIG. 1 is a top plan view of a calibration wafer containing a microroughness standard in accord with the present invention.

With reference to FIG. 1, a silicon wafer 10 is shown divided into a plurality of imaginary sections 12. The wafer is a highly polished semiconductor substrate, i.e., a bare polished wafer. The sections 12 are not physically marked on the wafer and do not extend all the way to the edge of the wafer. The sections 12 are for the purpose of indicating that selected sections, such as a checkerboard pattern, could be used to contain features of the present invention. Alternatively, the entire surface may be covered with the features, which are designed to mimic the effect of haze on a highly polished wafer surface.

Figure 2:
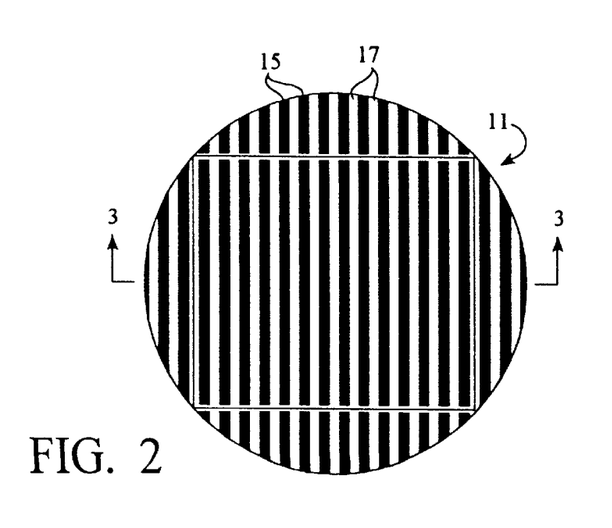
FIG. 2 is a magnification of a small portion of the wafer of FIG. 1 showing the characteristic feature pattern of the standard of the present invention.
Figure 3:
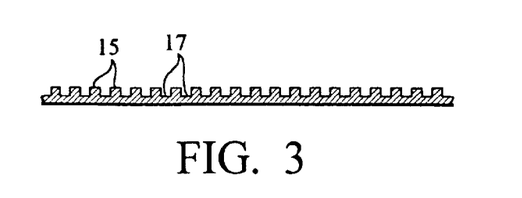
FIG. 3 is a side sectional view (not to scale) taken along line 3—3 in FIG. 2 and showing the feature pattern to consist of a square-wave pattern of alternating raised mesas and depressed valleys of equal width.

In FIG. 2, an enlargement of zone 11 of wafer 10 in FIG. 1 shows a pattern of parallel linear features 15 and 17 with regular pitch. In the sectional view in FIG. 3 and enlarged perspective view of FIG. 4, it is seen that the pattern consists of alternating raised and depressed features which form plateaus or mesas 15 and valleys or troughs 17 separated by essentially vertical side walls. Both the mesas 15 and valleys 17 have an essentially flat surface. The period or pitch is preferably about 20 $\mu m$ and both the mesas 15 and valleys 17 have the same width of about 10 $\mu m$, providing a 50% duty cycle for both types of features 15 and 17 in the overall pattern.

Figure 4:
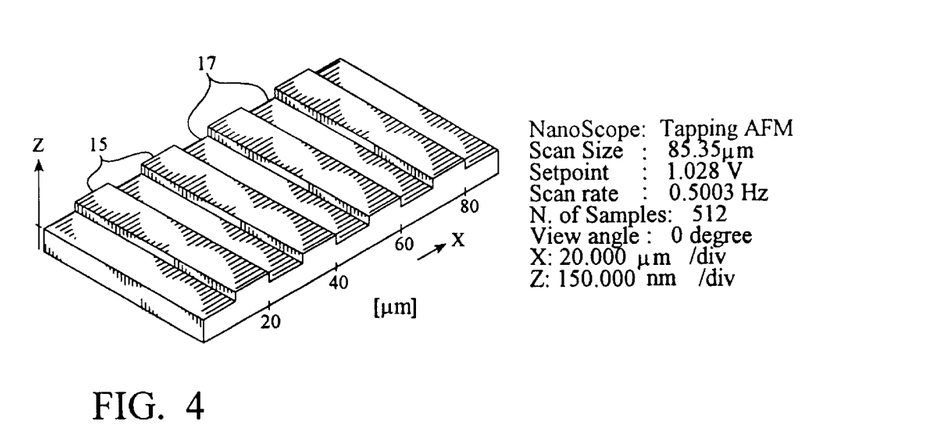
FIG. 4 is a perspective view of the feature structure of FIG. 3 and including parameters for a typical atomic force microscopy scan of the structure.

FIG. 4 also shows parameters for an atomic force microscopy scan of the square-wave structure. In order to characterize surfaces, it is useful to calculate statistical properties from the measurement data obtained from various instruments. The two most widely used of these parameters are the centerline average roughness, $R_a$, and rms roughness, $R_q$ (equation 1). Roughness values are calculated from the measured values of height variation, $Z_i$, over a portion of a surface with a given number of sample points, N.

$$R_a = \frac{1}{N}\sum_{i=1}^{N}|z_i|; R_q = \sqrt{\frac{1}{N}\sum_{i+1}^{N}z_i^2} \qquad (1)$$

Figure 5A:
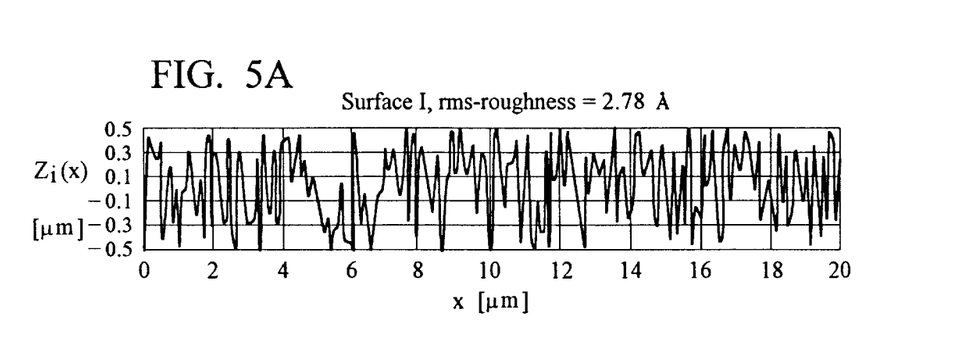
FIGS. 5a and 5b are graphs of deviations of surface height $Z_t(x)$ from an average height over positions x for two significantly different surface profiles with the same rms-roughness value.
Figure 5B:
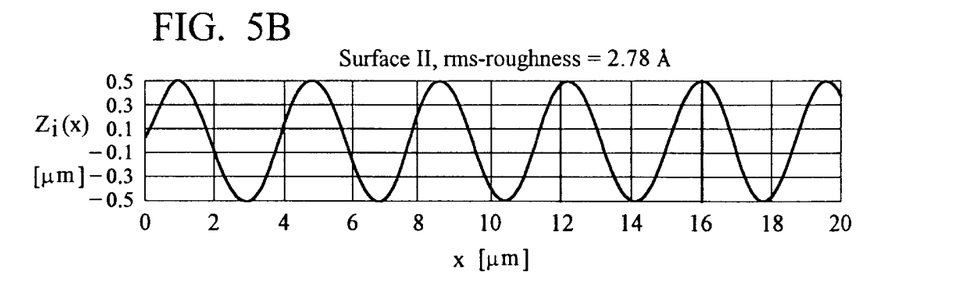

However, these parameters do not uniquely define a given surface as surfaces with completely different profiles may have identical height averages. FIGS. 5a and 5b contrast two significantly different surfaces exhibiting the same measured rms roughness value.

Moreover, measured roughness averages will depend on the spatial bandwidths over which they are taken. Surface texture is fractal in nature. A measurement system that samples, say, every 10 micrometers of a surface would totally miss the high spatial frequency variations on Surface I in FIG. 5a and reduce its average roughness. This produces a microroughness value that is much lower than would be obtained had it sampled every 1 micrometer.

A more complete surface quantification that takes instrument spatial bandwidth into account is the power spectral density (PSD) curve. The PSD function is the frequency spectrum of the surface roughness measured in units of spatial frequency, typically inverse micrometers. The PSD function provides information about both the amplitude and spatial wavelength (1/f) of the surface. From the PSD data, readings from various instruments may be correlated by incorporating their spatial bandwidths. This concept will be discussed in more detail later.

II. Instrument Considerations In Determination Of Microroughness

Figure 6A:
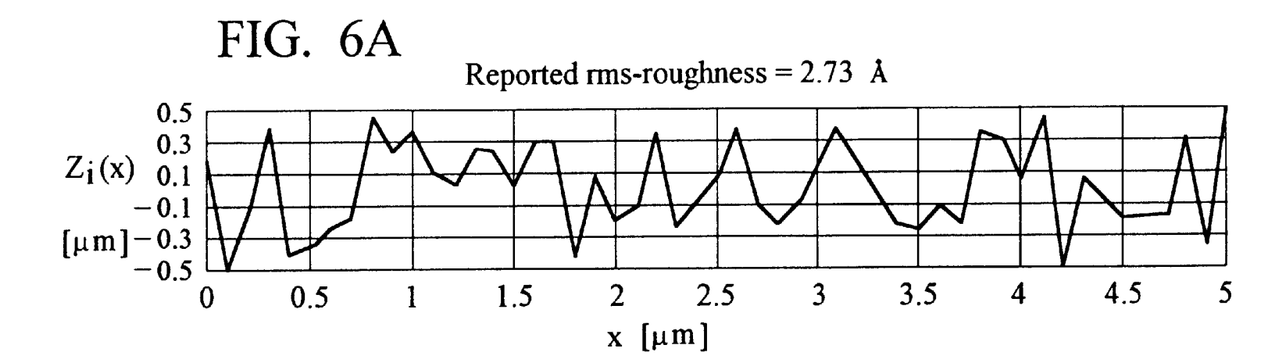
FIGS. 6a and 6b are graphs of measured rms-roughness of the surface profiled in FIG. 5a over the same sample area by two different surface topography instruments with differing spatial bandwidths.
Figure 6B:
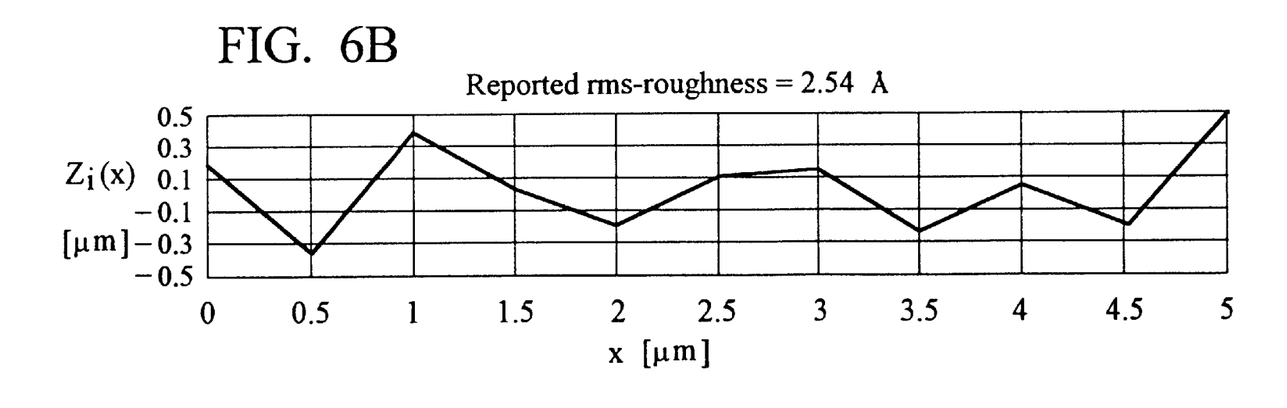

Consider the surface from FIG. 5a, magnified to show a similar section 5 $\mu m$ in length. As seen in FIGS. 6a and 6b if this surface is measured by an instrument which samples, say, every 0.5 $\mu m$ (FIG. 6b) as opposed to every 0.1 $\mu m$ (FIG. 6a), then the reported surface tends to look smoother since the high spatial frequencies are missed. This is analogous to the electrical phenomenon of aliasing. In this case however, rather than sampling a time-varying function at too low of rate, a spatially-varying function is sampled too infrequently for a proper representation of the actual surface. In other words, the high end spatial frequency capability (measured in units of inverse micrometers) of the sampling instrument is too low. On the other extreme, if the warp in a 200 mm silicon wafer is measured by a stylus profilometer with a traversing length of 50 μm, it never senses the warped condition of the surface. Since the warp in the wafer tends to be near the wafer diameter, this implies that the spatial wavelength is 200 mm (or, conversely, a spatial frequency of $5 \times 10^{-6}$ μm$^{-1}$).

The high frequency limit, $f_{max}$, of an instrument may be calculated directly by knowing the sampling distance, $\tau_0$, where $\tau_0$ is greater than or equal to the lateral resolution of the instrument.

$$f_{max} = \frac{1}{2\tau_0} \quad (2)$$

The factor of 2 in the denominator assures that the minimum Nyquist length criterion is met. This helps to minimize aliasing effects.

The low frequency limit, $f_{min}$, is simply determined from the evaluation length, L, such that $$f_{min} = \frac{1}{L} \quad (3)$$

where L is less than or equal to the traversing length, $L_t$. The spatial bandwidth (or bandpass) is then defined by these spatial frequency limits, or may be electronically narrowed (e.g., an electrical cut-off filter on a stylus profilometer).

In the case of a laser based instrument, such as an integrating scatterometer, the bandpass is defined somewhat differently. If the incident monochromatic laser beam, at incidence angle $\theta_i$, specular beam and scatter beams (at angles $\theta_s$) are all in the same plane, the spatial frequency is related to the scatter angle by the one-dimensional grating equation $$f = \frac{\sin\theta_s \cdot \cos\phi_s - \sin\theta_i}{\lambda} \quad (4)$$

where f is the spatial frequency and λ is the laser illumination wavelength. The $\phi_s$ term takes on values of 1.0 and –1.0 for $\phi_s = 0°$ and 180° respectively.

Ideally, the instrument transfer function is flat in the bandpass region and zero elsewhere. This is never achieved in practice and the spatial bandpass must always be convolved with the transfer function (if available) in order to achieve true inter-instrument comparisons.

Referring back to FIG. 6a, the first surface is reported by an instrument with a high frequency limit of at least 5 μm$^{-1}$ ($f_{max} = \frac{1}{2} \cdot (0.1 \mu m)$). This instrument reports an rms roughness level of 2.73 Å. In FIG. 6b, the second instrument is reporting 2.54 Å rms but has a high-end limit of 1 μm$^{-1}$ ($f_{max} = \frac{1}{2}(0.5 \mu m)$). However, this could be the same instrument with a low-pass filter employed. It is shown later that this difference in reported roughness can be much more drastic with even more diverse instruments.

Figure 7:
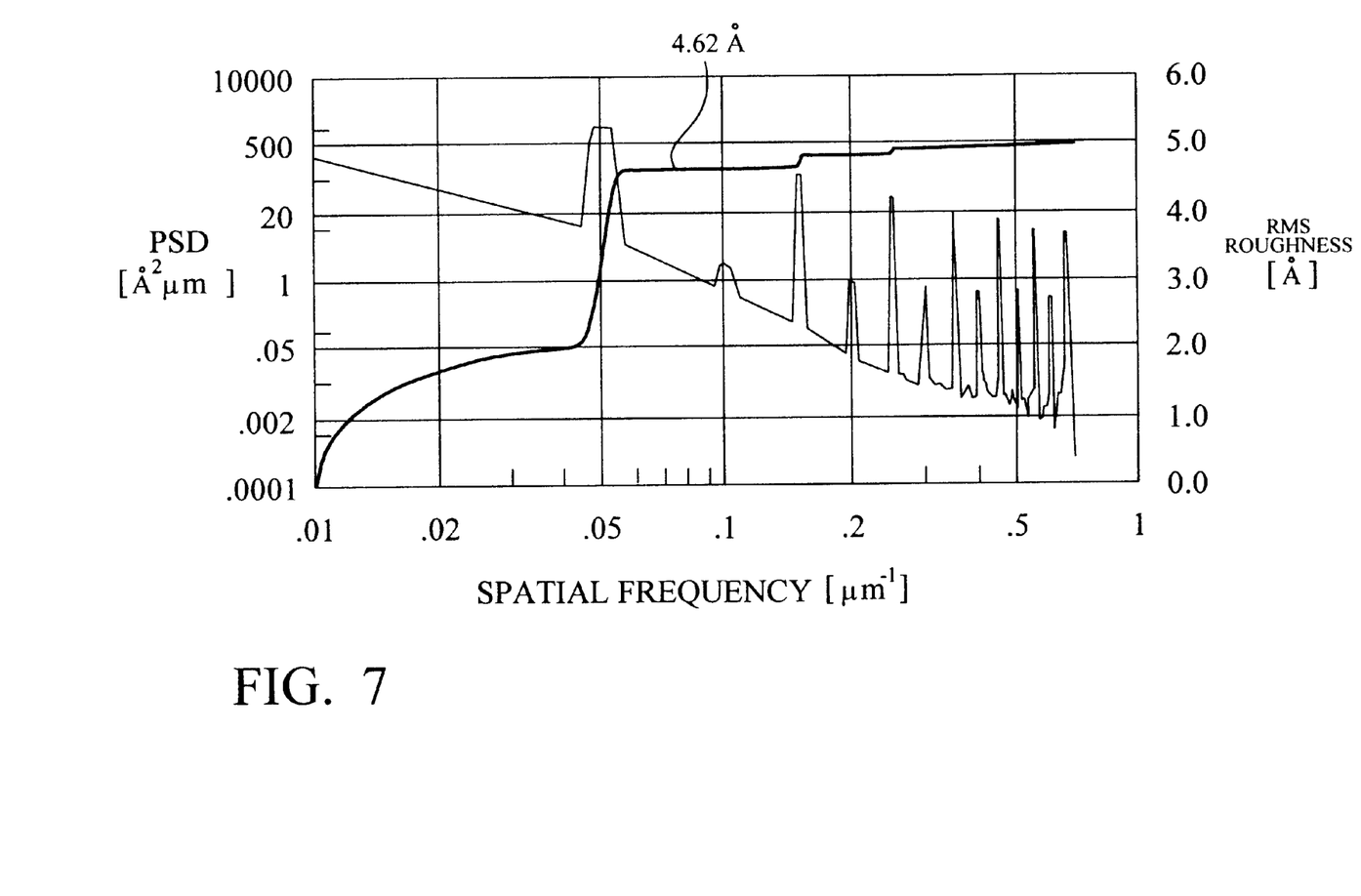
FIG. 7 is a graph of both power spectral density (PSD), and rms-roughness (integrated PSD) over a spatial frequency range of 0.01 to 1.0 $\mu m^{-1}$ obtained from angle-resolved light scattering scans of a standard of the present invention in accord with FIGS. 1–4.

FIG. 7 shows scans of an RQS nominal 5 Å standard of the present invention made with an angle-resolved scatterometer. The format of this graph is a one-dimensional power spectral density plot which relates surface roughness power per unit of spatial frequency. The PSD plot (the curve starting at the upper left corner of the graph and heading downward to the lower right corner) is the square of the modulus of the Fourier transform. Recall that the Fourier transform of a square wave with a 50% duty-cycle is an infinite series of odd-order harmonics. In the case of an exact 50% duty-cycle, there is an added benefit in that $R_q$, or the rms-roughness value is identically equal to the arithmetic, or $R_a$, roughness. This value then equals half the overall height (peak-to-valley) of the square wave. Referring again to FIG. 7, there are even order harmonics apparent here, but their amplitude is over two orders of magnitude lower than the primary peak at low spatial frequencies. Keep in mind that this is a log-log scale.

Figure 8:
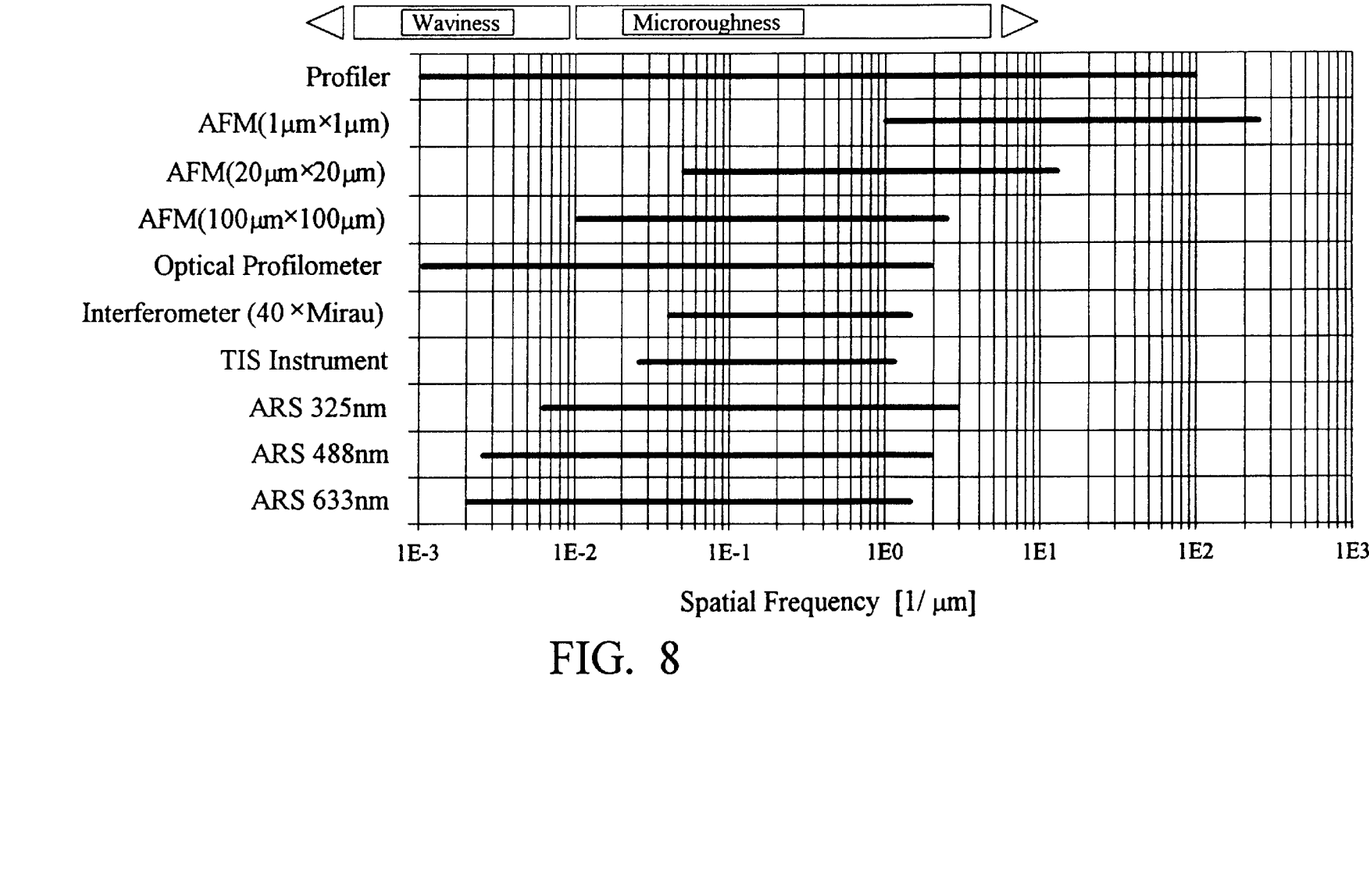
FIG. 8 is a chart showing bandwidths of various surface texture instruments that can be calibrated by the present invention.

The most useful feature of the PSD function is that it relates information about the Fourier transform of the surface into a form that makes it possible to readily compare information generated from various instruments. The rms roughness may be calculated directly as the square root of the integral of the one-dimensional PSD curve. In the case of the RQS standard, an isotropic roughness value needs to be added in as well to account for the inherent roughness of the silicon; this is described in section IV. Another compelling reason for making use of a square wave to produce a PSD plot is that over 90% of the power is contained in the first peak. This means that the standard is somewhat less sensitive to the exact instrument spatial bandwidth as long as at least the first peak is captured. Of course, it is important to completely integrate under the curve with the integration limits set equal to the instrument bandwidth for best results. FIG. 8 shows some typical bandwidth limits for various pieces of surface texture measuring equipment.

The scale on the right side of FIG. 7 indicates rms-roughness. Notice the curve starting at the lower left hand corner by 0.01 μm$^{-1}$. This is the square root of the integrated value under the PSD plot—yielding rms-roughness. At the cursor location on the curve corresponding to 0.06 μm$^{-1}$, the rms roughness value is 4.62 Å (indicate in the upper right corner), or about 93% of the total 4.98 Å level at 0.6 μm$^{-1}$.

FIG. 7 was generated by a TMA CASI(r) angle-resolved light scattering (ARS) instrument. This is a specialized tool that allows for first-principles traceability based on the wavelength of light and optical geometries of the instrument. Details of the ARS procedure are presented in depth in section IV (Determination of Specific Microroughness Levels). For now, it is important to realize how the same surface can be measured by completely dissimilar instruments and give the same results within the same bandpass.

The realization of the graph being on a log-log scale emphasizes the assertions made earlier about the essential importance of knowing the spatial bandwidth limits of a given instrument. In the case of a typical measured surface (one that does not possess the unique features of a square wave), there will be a continuous power spectrum. In this case, integration between the limits of 0.01 μm$^{-1}$ to 0.1 μm$^{-1}$ (which may be typical for an optical profilometer) may result in a rms roughness value over an order of magnitude higher as compared with a 1 μm×1 μm AFM scan (bandwidth of 1 μm$^{-1}$ to 256 μm$^{-1}$; recall that the high spatial frequency, based on 512 sample points, is calculated from equation 2 as $$\frac{1}{2\tau_0} = \frac{1}{2 \cdot (1 \mu m/512)} = 256 \; \mu m^{-1}).$$

Knowing the PSD of a given surface allows determination of rms-roughness in a straightforward manner. The rms roughness, Rq, between spatial frequencies $f_{min}$ and $f_{max}$, from a one-dimensional power spectral density function, $PSD_{1D}$, is $$R_q = \sqrt{2 \cdot \int_{f_{min}}^{f_{max}} PSD_{1D}(f) df} \qquad (5)$$

III. Design Considerations

The relationship between the surface PSD and the resulting scatter was introduced by Church into the optics literature in 1975 and has been extensively used to monitor micro-roughness via scatter measurement. The general technique is explained in the next section, with the key relationship, sometimes called the "Golden Rule" appearing as Equation 9. In order for this relationship to be used to find the PSD from the measured scatter, virtually all of the scatter must come from surface topography. Non-topographic sources of scatter include surface bound particles, films, oxide layers, and smooth surface index variations, such as those found across grain boundaries. Non-topographic sources of scatter follow other scatter laws besides that found in Equation 9. Sources of topographic scatter have the property that regardless of changes in wavelength, or incident angle, the same PSD will be calculated. This property is called wavelength scaling in the literature. Significant scatter from particles and grain boundaries as well as the interference effects associated with surface films have all been shown to produce significant variations in the calculated PSD. In other words, they do not wavelength scale.

Clean, polished silicon wafers have been shown to scatter topographically from the near IR to the UV. They can be produced virtually free of contamination and films, and as single crystal surfaces, they are free of effects from grain boundaries. In general, these surfaces are very low scatter, and for the spatial bandwidths in question can be characterized by a low level isotropic background roughness. Because techniques are available for producing designed surface structures on silicon, this is an ideal material for a micro-roughness standard.

The basic design employs a nominally 50% duty-cycle square wave with a period of 20 $\mu$m. This produces a fundamental spatial frequency component of 0.05 mm$^{-1}$ followed by odd harmonics at 0.15 mm$^{-1}$, 0.25 mm$^{-1}$, etc.

IV. Determination Of Specific Microroughness Levels

Since all of the data from angle-resolved scatterometry are binned into discrete points, the "integration" required to turn these data into a rms-roughness value merely becomes the square root of the summation of the one-dimensional PSD function, $PSD_{1D}(f)$, multiplied times the differential frequency step size within the appropriate limits of integration.

$$R_q = \left(2 \int_{f_l}^{f_h} PSD_{1D}(f) df\right)^{1/2} \Rightarrow R_q = \sqrt{2 \sum_{i=f_l}^{f_h} PSD_{1D} \delta f} \qquad (6)$$

Note also that the equation signifies the limits of integration denoted fl and $f_h$ which are set according to the spatial bandwidth limits of the instrument under test. To account for the inherent isotropic roughness of the silicon, we also need to add in an additional term $PSD_{iso}$ to equation 6. The final formula for the RQS standard takes the form of equation 7.

$$R_q = \left(2 \int_{f_l}^{f_h} PSD_{1D}(f) df + \int_{f_l}^{f_h} PSD_{iso}(f) df\right)^{1/2} \qquad (7)$$

This is the equation that is used to certify a rms-roughness value for the standard for a given range of integration limits.

IV.1 Development of the PSD Calibration Curve

The actual quantity measured through angle-resolved scatterometry is the bi-directional reflectance distribution function (BRDF), $$BRDF = \frac{P_s / \Omega_s}{P_i \cdot \cos\theta_s} \qquad (8)$$

where $P_s$ is the power of the scattered light collected over the solid angle $\Omega_s$ as a function of the angle $\theta_s$. The factor $P_i$ indicates the incident laser power at angle $\theta_i$ from the wafer normal. Therefore, BRDF is physically nothing more than the redistributed energy scattered into a given solid angle. Recall from equation 4 that the spatial frequency, f, is related to the scatter angle by the one-dimensional grating equation $$f = \frac{\sin\theta_s \cos\phi_s - \sin\theta_i}{\lambda}$$

The PSD function then is calculated from the BRDF and is a measure of the scattered power per unit of spatial frequency in units of Å$^2\mu$m$^2$.

$$PSD(f_x, f_y) = \frac{10^8 \lambda^4 BRDF}{16\pi^2 \cdot \cos\theta_s \cdot Q}, \qquad (9)$$

where, for s-polarization, the factor Q is approximated by the specular reflectance of the wafer surface. The reflectance is a function of wavelength, incidence angle, and polarization. If the surface is isotropic, $PSD(f_x, f_y)$ may be integrated around the azimuthal angle $\phi_s$ to obtain an isotropic PSD function $$PSD_{iso}(f) = \int_o^{2\pi} PSD(f_x, f_y) f d\phi_s = 2\pi f \cdot PSD(f_x, f_y) \qquad (10)$$

with units of Å$^2\mu$m and f equals the root-sum-of-squares of $f_x$ and $f_y$. It is this function, $PSD_{iso}(f)$ in equation 10, that is added to the one-dimensional PSD function and becomes the function from which rms roughness is calculated. The square wave is a one-dimensional scatterer, however, the roughness of the silicon "peaks and troughs" are isotropic scatterers. Therefore, two measurements are made—one with the direction of the square wave surface perpendicular to the plane-of-incidence of the laser (for the overall one-dimensional PSD curve generation), and one where the surface is parallel. The second scan measures the silicon roughness, independent of the etched features. This value is then converted to an isotropic value, equation 10, and then added as the root-sum-of squares to the one-dimensional scan (equation 7). The silicon roughness is really only significant at low nominal roughness values but is consistently measured as a matter of practice.

Figure 9:
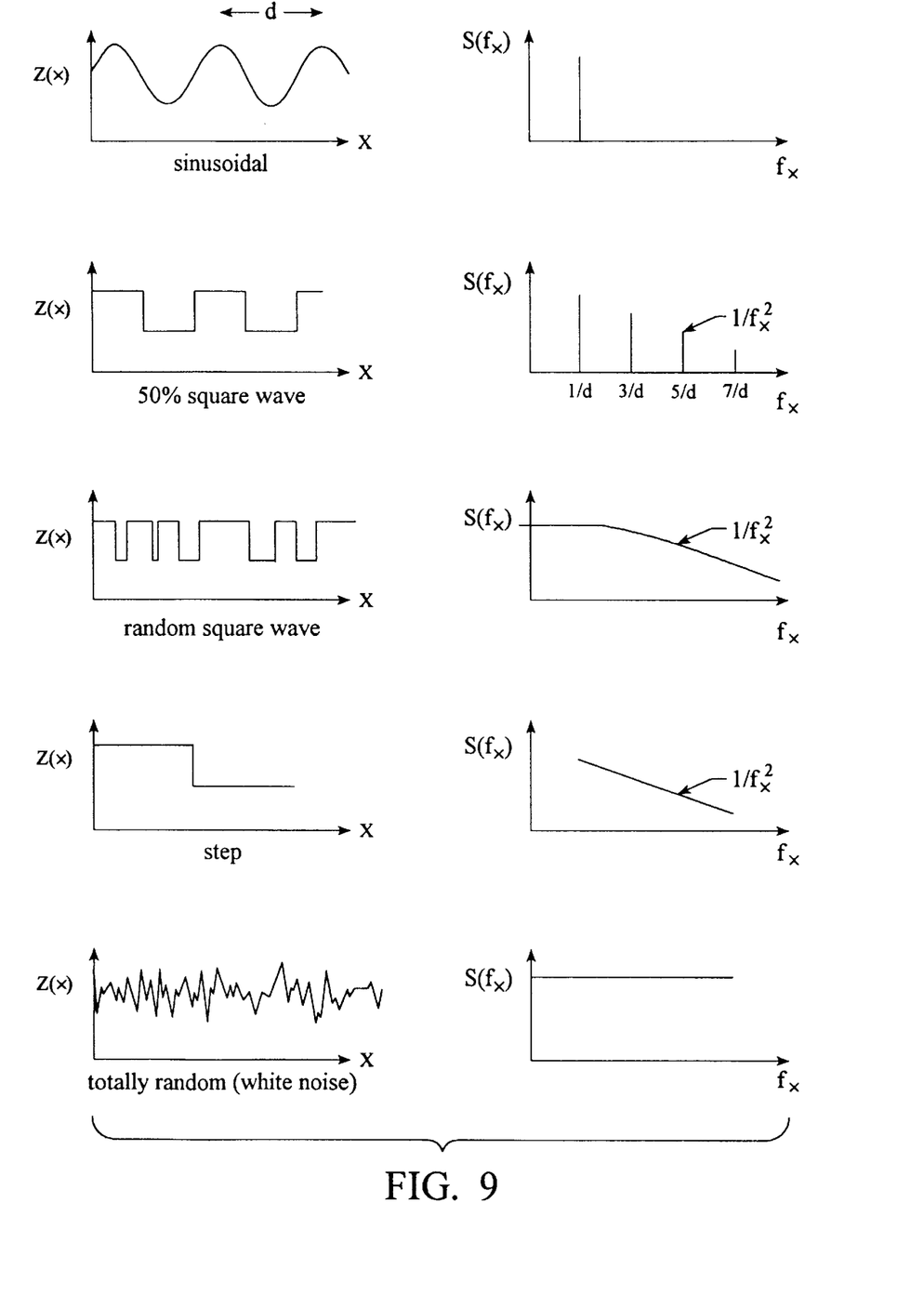
FIG. 9 are graphs of surface profile Z(x) and resulting PSD function $S(f_x)$ for various types of surfaces. The second surface graphed represents a one-dimensional square-wave surface of 50% duty cycle, in accord with the present invention.

FIG. 9 provides some reference as to what type of one-dimensional PSD function may be expected for various surfaces typically encountered. (These examples are adapted from W. Murray Bullis, ECS presentation at *Particles, Haze and Microroughness Symposium*, San Jose, Calif., September 1994). The reader versed in signal theory will also note the analogy to Fourier analysis of communications signals.

Figure 10:
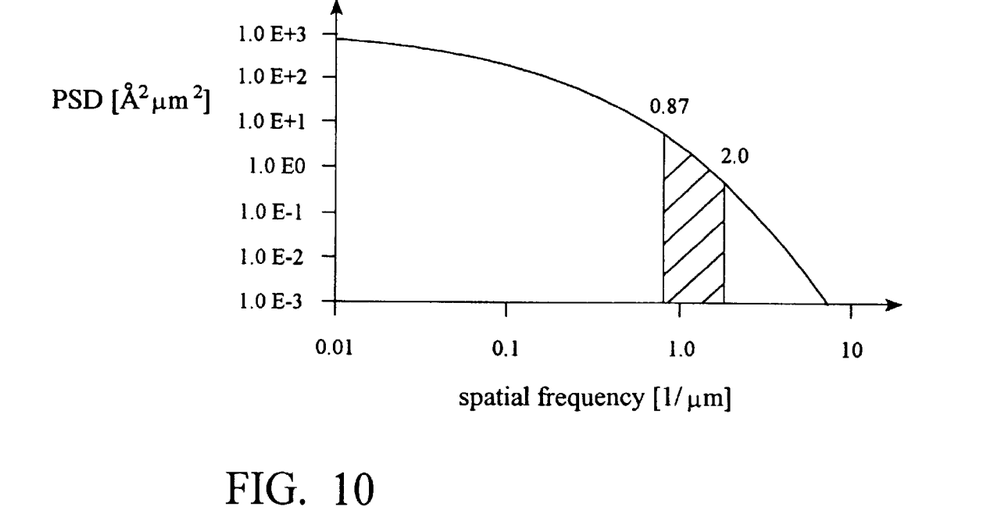
FIGS. 10 and 11 are graphs of power spectral density (PSD) function versus spatial frequency and illustrating differing spatial frequency bandwidths (shaded portions) for a total integrated scatterometer and an atomic force microscope, respectively.
Figure 11:
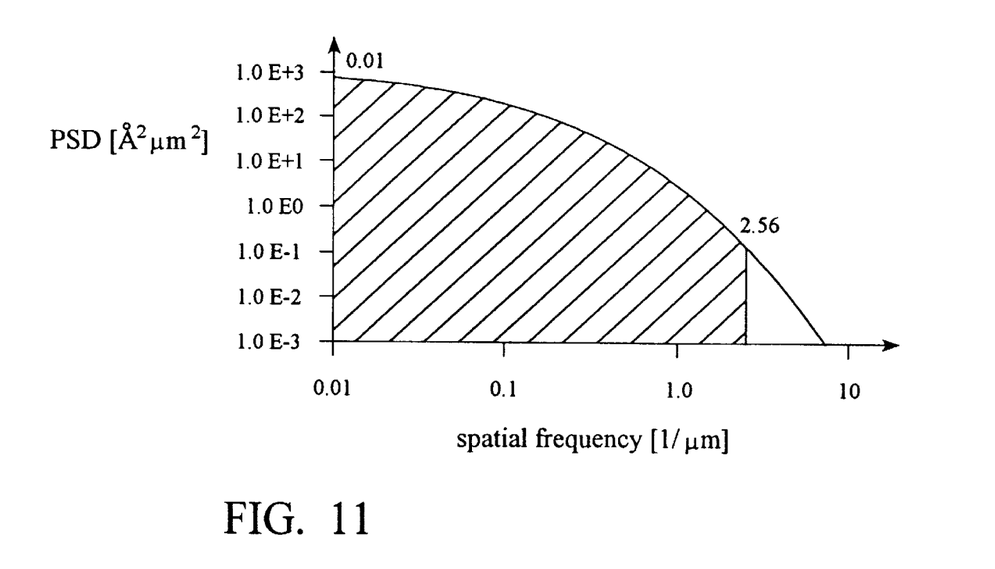

FIGS. 10 and 11 summarize the determination of the power spectral density function and spatial frequency bandwidth for scattering instruments (e.g., total integrated scatterometers) and profilers (e.g., atomic force microscopes), respectively. Notice that the instruments may be correlated directly in the region of bandpass overlap. In particular, FIG. 10 illustrates the determination of the PSD and related spatial frequencies for a generic total integrated scattering inspection system. PSD is a measure of the scattered power per unit of spatial frequency. The PSD is calculated as per equation (9). FIG. 11 illustrates the determination of the PSD and related spatial frequencies for a surface profiling system (e.g., an atomic force microscope). The PSD is calculated as the square of the Fourier transform from a 2-D surface profile:

$$PSD(f_x, f_y) = \frac{d^2}{MN} \left| \sum_{k=1}^{m} \sum_{j=1}^{N} z_{j,k} \cdot \exp\{-i2\pi[f_x(j-1) + f_y(k-1)]d\} \right|^2$$

where $f_x$, $f_y$ are the spatial frequencies such that $f_x$=K/L with K being an integer 1,2, . . . , N/2, and d is the same in both the x- and y-directions. Again, the units are $Å^2 \mu m^2$.

V. Manufacture of Standard

Figure 12:
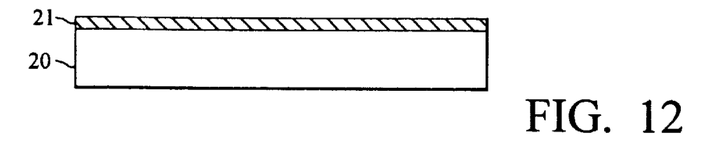
FIGS. 12–17 are side views of a wafer standard in various stages of manufacture according to a first manufacturing process.

The standard may be manufactured according to the techniques described in U.S. Pat. No. 5,599,464. In FIGS. 12–17, manufacture of a single feature is shown, but in practice, all of the features on the wafer, perhaps millions, would be made simultaneously. FIG. 12 shows a silicon wafer 20 having a uniform layer 21 of silicon dioxide thermally grown onto the silicon substrate. The silicon dioxide layer has a thickness of between 500 Å and 1000 Å. In the book Silicon Processing for the VLSI Era, vol. 1, p. 200–212, the thermal oxidation of silicon is explained. The book mentions that Deal and Grove described silicon oxidation as proceeding by the diffusion of an oxidant, such as molecular oxygen, through an existing oxide to the silicon-silicon dioxide interface, where molecules react with silicon to form silicon dioxide. In other words, oxygen migrates to the bare silicon substrate, where it interacts with silicon, thereby lowering the level of the silicon/silicon dioxide interface in places where oxidation has occurred. This is a key aspect of the present invention.

Figure 13:
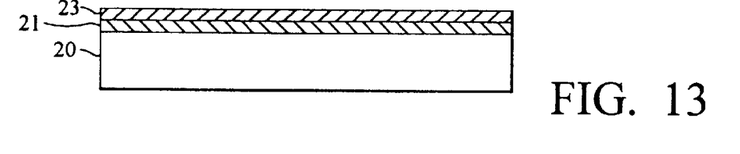

In FIG. 13, a thin layer 23 of positive photoresist is applied. The photoresist may be patterned 10 with the desired location, areawise extent, and overall density of features by means of a mask. When light is used to expose the photoresist layer 23 through the mask, a latent image of the features is formed in the photoresist by light. In other words, the chemical bonds in the exposed photoresist are broken, altering the molecular weight and solubility of the resist, which allows the latent image to be developed, removing the exposed photoresist in the etched area, uncovering the underlying silicon dioxide layer. In the case of positive photoresist, the bonds of the exposed photoresist are broken.

Figure 14:
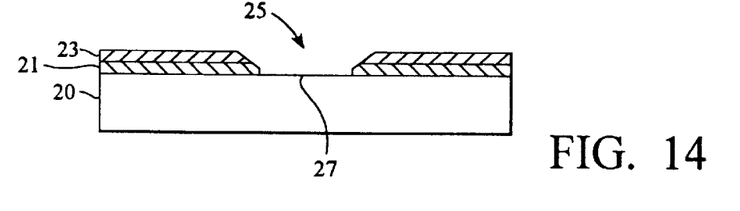

In FIG. 14, portions of the resist layer 23, now removed, create an aperture 25 where the resist has been exposed by light. An oxide etchant is used to remove silicon dioxide down to the upper surface 27 of the silicon substrate 20, which is uniformly lower than the original level.

Figure 15:
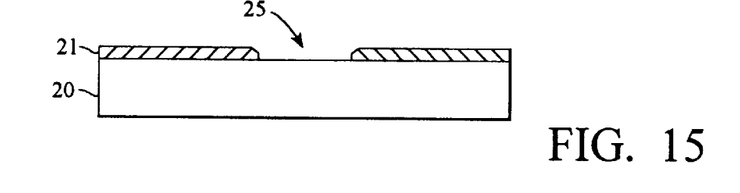
Figure 16:
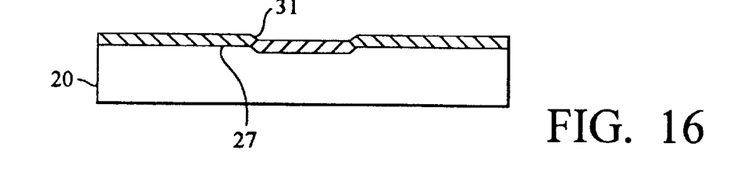

In FIG. 15, the photoresist is stripped from the oxide layer 21. The aperture region 25, now a single pit 31 in an array of similar pits which will form topographic features, including the light scattering features of the present invention, undergo self-limiting reoxidation due to exposure to air. Any oxidizing ambient environment could be used, but air is effective and inexpensive. Air oxidation at room temperature produces native oxide which has a thickness of approximately 17 Å. Approximately half of the native oxide layer consumes silicon at the substrate interface. This is shown in FIG. 16, where the native oxide at the bottom of a pit extends into the silicon substrate, below the former level 27 supporting the silicon dioxide. The formation of the native oxide layer is rapid, but generally stops by itself after a short time.

Figure 17:
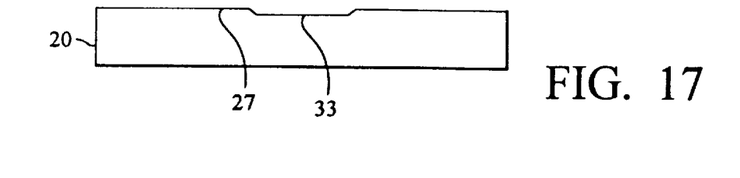

Next, all of the oxide is stripped, as shown in FIG. 17. It is now apparent that a differential step height exists between the bottom of the pit 33 and the former base 27 which supported the silicon dioxide.

In FIGS. 12–17, the construction of a topographic feature has been shown using a dark field mask, resulting in a pit 33 within a light reflecting field 27. A reverse process could be used, producing a feature having a step height, rather than a pit. The reverse process could be achieved with reverse masks or with photoresist of the opposite type. This reverse process is illustrated in FIGS. 18–23.

Figure 18:
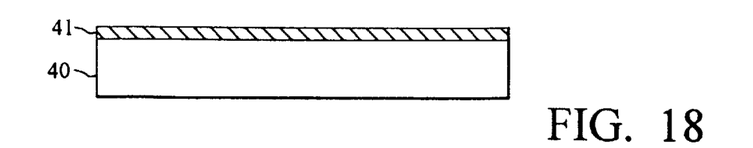
FIGS. 18–23 are side views of a wafer standard in various stages of manufacture according to a second manufacturing process.

In FIG. 18, a uniform thermal oxide layer 41 is grown on a polished, light-reflective silicon wafer 40 to a thickness which is between 700 Å and 1000 Å. Such layers are readily produced in the semiconductor industry with good consistency and uniform thickness over the surface of a wafer. Lesser thicknesses could be produced, but the range of 700 Å to 1000 Å is preferred because of the ease of manufacturing and of verifying the thickness with measuring instruments.

Figure 19:
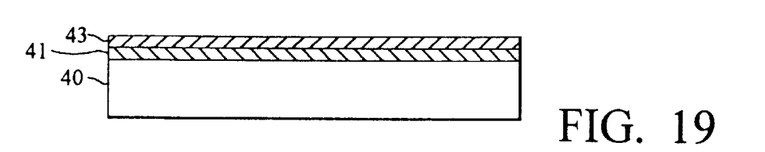

In FIG. 19, a layer of photoresist 43 is disposed over the thermal oxide layer 41. The photoresist is exposed to light through a mask which is the optical complement of the mask used for the exposure previously described with respect to FIGS. 13 and 14.

Figure 20:
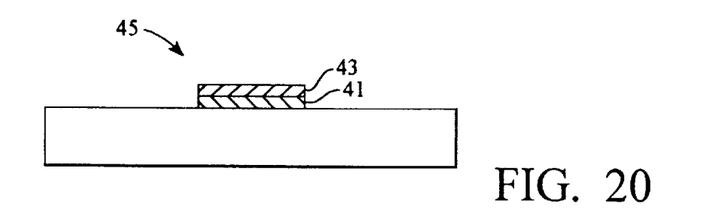
Figure 21:
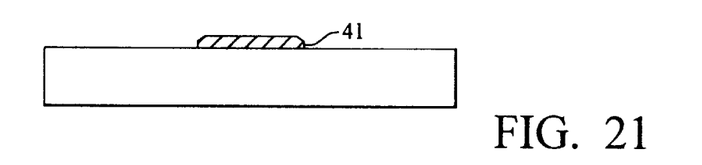

After removing the exposed portions of the photoresist and etching the oxide, a mesa is left, as shown in FIG. 20. The mesa 45 consists of a small layer of photoresist 43 atop a similarly sized layer of thermal oxide 41. In FIG. 21, the photoresist portion is shown to be stripped away.

Figure 22:
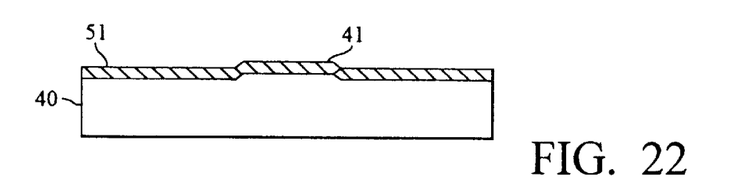
Figure 23:
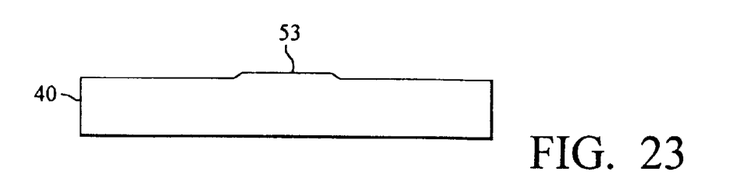

In FIG. 22, a very thin layer of native oxide 51 grows on the exposed silicon as air is allowed to be in contact with the wafer, consuming silicon below the initial wafer level. The silicon dioxide island 41 is removed, leaving a small mesa or feature 53, which also is exposed to air and has a uniformly thin native oxide layer. The feature 53 extends approximately 8 Å to 9 Å above the surface of the surrounding silicon field.

VI. SUMMARY

When making comparisons between different types of texture measurement tools, it is extremely important to report the spatial bandwidth along with the reported rms-roughness value. Even when comparing results between the same instrument type, the operating parameters can significantly affect the reported results. This variation can be well over an order of magnitude different. Ideally, the transfer function for a given instrument must also be known for the best quantitative comparison between toolsets.

Finally, a practical microroughness standard has been developed that is based upon the principles of optical scatterometry for certification. This standard allows for comparison between seemingly uncorrelatable tools, within the proper spatial bandwidth for each toolset. Using this methodology, it is possible to compare microroughness readings on a TIS system to the microroughness readings on an atomic force microscope.

We claim:

1. A metrology standard for calibrating microroughness measuring instruments, comprising:

a physical artifact having a generally smooth reflective surface but with regular features formed thereon, said features characterized by a one-dimensional, 50%-duty cycle, square-wave pattern with a periodicity or pitch of less than 100 µm and with a single feature depth of at least about 8 Å, whereby said pattern of said features is characterized by a power spectral density distribution versus spatial frequency, whenever measured by a said microroughness measuring instrument, with discrete peaks in said distribution located at a fundamental spatial frequency of the inverse of said pitch and at odd-order harmonics thereof.

2. The metrology standard of claim 1 wherein said physical artifact is a silicon wafer.

3. The metrology standard of claim 1 wherein said characteristic power spectral density distribution of said pattern of features has about 90% of spectral power located in said peak at said fundamental spatial frequency.

4. The metrology standard of claim 1 wherein said pitch is about 20 µm, whereby said fundamental spatial frequency is 0.05 µm$^{-1}$.

5. A method of calibrating a microroughness measuring instrument, comprising:

placing a metrology standard in microroughness measuring relation to said instrument, said metrology standard being a physical artifact having a generally smooth reflective surface but with regular features formed therein, said features characterized by a one-dimensional, 50%-duty cycle, square-wave pattern with a periodicity or pitch of less than 100 µm and with a known feature depth of at least about 8 Å, measuring microroughness of said metrology standard with said instrument, including calculation of a power spectral density over a range of spatial frequencies characteristic of said instrument, integrating said power spectral density over said range, and taking the square root of said integrated power spectral density, said root being a measure of rms-roughness of said standard, said power spectral density having a characteristic distribution versus spectral frequency that includes discrete peaks located at a fundamental spatial frequency and odd harmonics thereof, said fundamental spatial frequency being an inverse of said pitch of said pattern of features, said spatial frequency range of measuring by said instrument including at least said peak at said fundamental spatial frequency, and comparing said rms-roughness resulting from measurement by the instrument with a calculated rms-roughness associated with said standard of known feature depth.

6. The method of claim 5 wherein said instrument is selected from the group consisting of mechanical profilers, atomic force microscopes, optical profilometers, interferometers, total integrated scatterometers and angle-resolved scatterometers.

* * * * *